No. 673,597. Patented May 7, 1901.
C. DIEHL.
PRESSURE WATER FILTER.
(Application filed Mar. 6, 1899. Renewed Feb. 15, 1901.)
(No Model.)

Witnesses
Samuel Stuart
William Preston

Inventor
Charles Diehl
By

UNITED STATES PATENT OFFICE.

CHARLES DIEHL, OF PHILADELPHIA, PENNSYLVANIA, ASSIGNOR OF ONE-HALF TO HENRY H. NETTER, OF SAME PLACE.

PRESSURE WATER-FILTER.

SPECIFICATION forming part of Letters Patent No. 673,597, dated May 7, 1901.

Application filed March 6, 1899. Renewed February 15, 1901. Serial No. 47,484. (No model.)

*To all whom it may concern:*

Be it known that I, CHARLES DIEHL, a citizen of the United States, residing at Philadelphia, in the county of Philadelphia and State of Pennsylvania, have invented a certain new and useful Improvement in Pressure Water-Filters, of which the following is a specification.

My invention relates to a new and useful improvement in pressure water-filters, and has for one object to provide a simple and effective apparatus of this description which will permit a continuous and steady flow of water and at the same time entirely remove all impurities therefrom.

A further object of my invention is to provide ready means for cleaning the filter of the accumulations of foreign matter without disconnecting or opening the same; and the principal object of my invention is to provide a relatively large filtering-surface in order that water under pressure will not be unduly forced in passing therethrough, thereby more effectually removing the impurities from the water, while permitting an ample supply to pass through the filtering material; and a still further object of my invention is to provide means for removing the principal foreign matter held in mechanical suspension before the water reaches the filtering material, thus largely avoiding the clogging of said filtering material.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1:
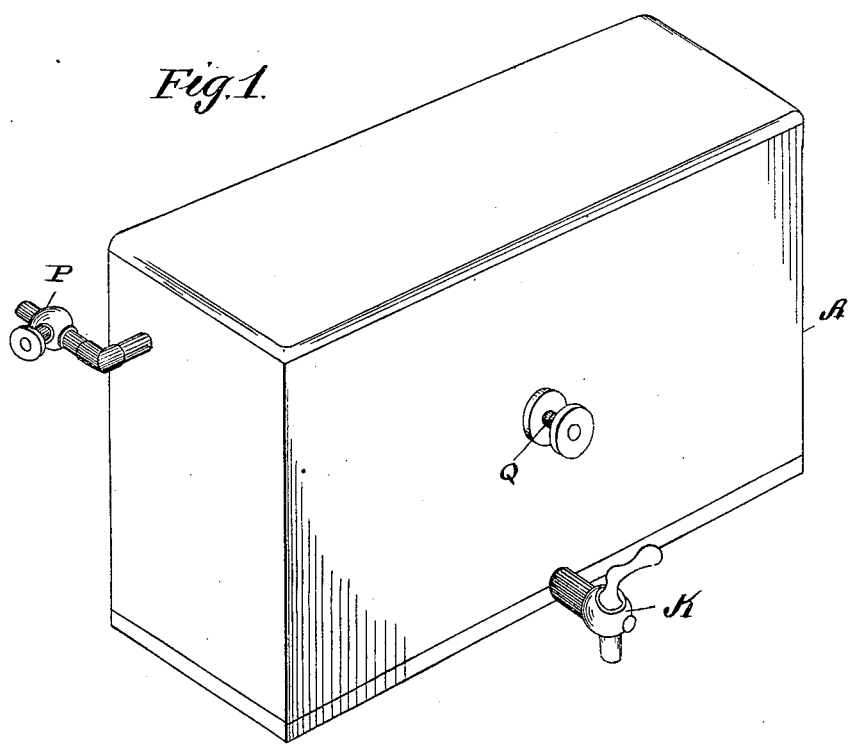
Figure 2:
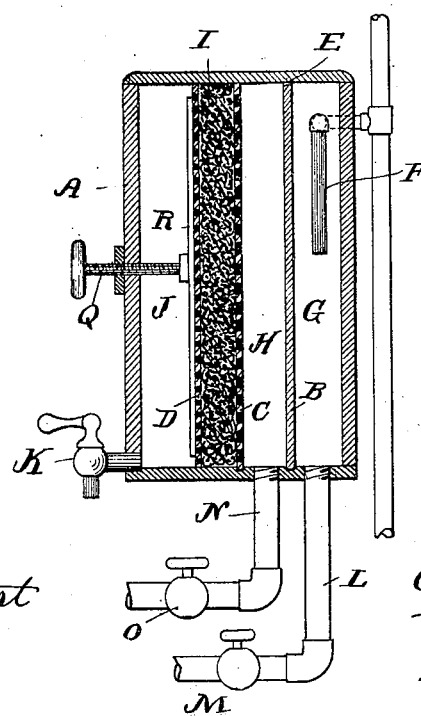

Figure 1 is a perspective of a filter made in accordance with my improvement, and Fig. 2 a cross-section showing the interior construction thereof.

In carrying out my invention as here embodied, A represents the casing, which may be of any suitable material, preferably of wood, and I prefer that this casing be rectangular in shape, as shown. The interior of the casing is divided into compartments by the partitions B, C, and D, the partition B being solid and so fitting within the casing as to permit the passage of water only at the point E, where it does not quite reach the top of the casing, thus forming a narrow opening throughout the length of the filter.

The inlet-pipe F leads to the compartment G and projects downward therein to about half the height of said compartment, so that when water flows through this pipe and fills this compartment it will flow through the narrow opening E into the compartment H. This action will cause any mud or other heavy foreign matter which may be suspended in the water to settle at the bottom of the compartment G, while the water freed therefrom passes, as just described, to the compartment H. The partitions C and D are perforated or of wire-netting and have closed therebetween the filtering material I, which I prefer shall be a prepared paper, as hereinafter described, and as this material extends throughout the length and height of the casing an exceedingly large surface is exposed to the water in the compartment H, thereby permitting said water to percolate through this material without undue haste in reaching the compartment J, while at the same time a sufficient quantity of water will pass through this large surface to permit a full and steady supply to flow from the faucet K when the latter is opened. This is an important feature, since when the water is crowded through a small filtering-surface the surface soon becomes clogged and the flow to that extent is cut off, so that the point at which the filtered water is withdrawn gives out but a small stream, and, furthermore, this crowding of the water through a small surface impairs the filtering process, since a slow percolation of the water through a large body of material comes nearer to a duplication of the process which takes place in nature.

In practice I prefer that the compartment J shall be of sufficient size to hold a considerable supply of filtered water, since thereby the amount usually desired for domestic use at any one time may be quickly withdrawn, even though an equal quantity does not pass through the filtering material, as this compartment J will act as a storage-reservoir.

The pipe L, of relatively large size, is connected with the bottom of the compartment G and has therein a stop-cock M, so that the foreign matter—such as mud, which tends to settle at the bottom of the compartment G—will pass into this pipe and there remain until the stop-cock M is opened, when it will be blown therefrom. Likewise a pipe N is connected with the bottom of the compartment H and has a stop-cock O therein for a similar purpose. By this arrangement when it is desired to clean the apparatus of the accumulated impurities this may be readily done by opening first the stop-cock M, as just described, permitting the full water-supply entering through the pipe F to pass downward through the compartment G and the pipe L and flow into a sink or other receptacle to which the pipe L leads. After the compartment G has been thus cleansed the compartment H will likewise be cleansed by the opening of the stop-cock O, which will cause the full water-supply to flow through the pipe N, and as the pipe N is of larger capacity than the inlet-pipe F all of the water stored within the compartment H will be withdrawn therefrom, and thereafter the supply flowing from the compartment G to the compartment H will do so in the form of a thin sheet of water caused by passing through the narrow opening E, and this sheet of water will be projected against the inner surface of the filtering material I and the partition C, and thereby wash therefrom any impurities which may have lodged thereon, causing them to pass off through the pipe N. During this process of cleansing the filtered water contained in the compartment J will percolate backward through the filtering material on account of the water-pressure being removed from the inner surface of said material, and this flowing of the filtered water reversely through the filtering agent will further tend to remove the impurities from the inner surface thereof.

The top of the filter may be secured thereon in any suitable manner; as by screws or clamps, so as to be easily removed, and when so removed the partitions may be then withdrawn from the casing, thus leaving an open space, which may be readily scrubbed or otherwise cleaned when occasion requires, the partitions being set in grooves, so as to be readily removed and replaced.

For convenience in controlling the water-supply a valve P is located in the pipe F just outside of the casing.

The filtering agent I prefer to make of what is known as "filtering-paper" by boiling the same until disintegrated into pulp form and then molding this pulp in a rectangular mold, in the bottom of which is placed the partition C, and as this partition is preferably made of heavy wire-netting of coarse mesh the filtering material will in its plastic form embed itself in these meshes, so that when it is placed within the casing and the partition D brought to bear thereagainst any tendency upon the part of the material to move downward will be prevented.

A threaded rod Q is run through the front of the casing and bears against the brace-strips R, which in turn bear against the partition D, and thus permit pressure to be exerted upon the filtering material by the manipulation of the threaded rod. The result of this is that the density of the filtering material may be regulated by varying this pressure, and thus the filter made to work more or less rapidly. Another advantage of this arrangement is that sufficient pressure may be brought to bear upon the filtering material by the manipulation of the threaded rod to force a portion thereof through the meshes of the partition C. Thus by removing the cover the inner protruding surfaces of the inner filtering material may be removed by the use of a suitable brush, thus presenting an entirely new filtering surface for the further operations of the apparatus. This removing of the inner surfaces of the filtering material may be continued from time to time until the body thereof has been so reduced as to require renewing, which may be readily accomplished, as before described, in connection with the original formation of this material.

In practice I prefer to make the casing of hard wood, the inner surface thereof being enameled or otherwise treated, so as to prevent the absorption of the water.

Having thus fully described my invention, what I claim as new and useful is—

1. A water-filter consisting of a rectangular casing, partitions located within said casing so as to divide it into compartments, a suitable filtering agent located between two of said partitions, the latter being perforated, a supply-pipe leading to the rear compartment whereby water is admitted thereto and permitted to flow to the next compartment through a narrow space over the top of the partition, blow-off pipes leading from the two rear compartments, and a faucet connected with the front compartment for withdrawing the filtered water therefrom, as specified.

2. A water-filter consisting of a rectangular casing, a partition B fitted therein so as to form the compartment G, said partition extending within close proximity to but not in contact with the top of the casing, so as to form a narrow opening at this point for the flow of water from the compartment G, a perforated partition C so located as to form the compartment H in connection with the first-named partition, a partition D also perforated so as to form the compartment J, a filtering agent located between the two perforated partitions, an inlet-pipe entering the compartment G and extending downward to approximately half its height, a faucet for withdrawing the filtered water from the compartment J, a blow-off pipe L connected with the bottom of the compartment G for receiving the accumulations of foreign matter, a stop-cock M for permitting the outflow of water and accumulations from the pipe L, a pipe N connected with the bottom of the compartment H, and a stop-cock O located in said pipe for controlling the outflow therefrom, as and for the purpose set forth.

3. A water-filter consisting of a casing, a partition therein extending from the bottom upward with a small opening between the top and the upper end of the partition, an inlet and an outlet pipe, perforated partitions inclosing a filtering agent, and chambers formed by the several partitions.

4. In a water-filter, a casing, an inlet-pipe extending downwardly in the casing, a partition dividing the casing into two chambers communicating through an opening between the top of the partition and the top of the casing, perforated partitions embracing a filtering material and means for regulating the density of said filtering material.

In testimony whereof I have hereunto affixed my signature in the presence of two subscribing witnesses.

CHARLES DIEHL.

Witnesses:
MARY E. HAMER,
SAMUEL STUART.